(12) United States Patent
Kruse et al.

(10) Patent No.: US 8,771,392 B2
(45) Date of Patent: Jul. 8, 2014

(54) DEVICE FOR PARTICLE SEPARATION IN AN EXHAUST-GAS RECIRCULATION SYSTEM AND MOTOR VEHICLE HAVING THE DEVICE

(71) Applicant: EMITEC Gesellschaft für Emissionstechnologie mbH, Lohmar (DE)

(72) Inventors: Carsten Kruse, Troisdorf (DE); Thomas Nagel, Engelskirchen (DE); Ferdi Kurth, Mechernich (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 13/729,927

(22) Filed: Dec. 28, 2012

(65) Prior Publication Data
US 2013/0111860 A1    May 9, 2013

Related U.S. Application Data

(63) Continuation of application No. PCT/EP2011/060399, filed on Jun. 22, 2011.

(30) Foreign Application Priority Data

Jun. 28, 2010   (DE) .................. 10 2010 025 284
Nov. 3, 2010    (DE) .................. 10 2010 050 393

(51) Int. Cl.
| | | |
|---|---|---|
| *B01D 50/00* | (2006.01) |
| *B01D 59/50* | (2006.01) |
| *F01N 3/00* | (2006.01) |
| *F01N 3/02* | (2006.01) |
| *F02M 35/024* | (2006.01) |
| *B01D 46/10* | (2006.01) |
| *F02M 35/04* | (2006.01) |
| *F01N 13/02* | (2010.01) |
| *F01N 3/021* | (2006.01) |
| *F01N 3/022* | (2006.01) |
| *F01N 3/023* | (2006.01) |

(52) U.S. Cl.
CPC ............ *F02M 35/024* (2013.01); *B01D 46/10* (2013.01); *F02M 35/04* (2013.01); *F01N 13/02* (2013.01); *F01N 3/021* (2013.01); *F01N 3/022* (2013.01); *F01N 3/023* (2013.01)
USPC .............................. 55/385.3; 60/274; 60/311

(58) Field of Classification Search
CPC ...... F02M 35/024; F02M 35/04; F01N 13/02; F01N 3/021–3/023; B01D 2279/60; B01D 46/10
USPC .......................... 55/385.3, 385; 60/274, 311
See application file for complete search history.

(56) References Cited

U.S. PATENT DOCUMENTS 1,190,511 A * 7/1916 Buschner ...................... 210/314
1,310,055 A * 7/1919 Caldwell ....................... 210/164
(Continued)

FOREIGN PATENT DOCUMENTS

DE    10 2008 038 983 A1    2/2010
WO    2007/110170 A1        10/2007

OTHER PUBLICATIONS

International Search Report of PCT/EP2011/060399.

*Primary Examiner* — Amber Orlando
(74) *Attorney, Agent, or Firm* — Laurence A. Greenberg; Werner H. Stemer; Ralph E. Locher

(57) ABSTRACT

A device for separating particles from an exhaust gas of an internal combustion engine includes at least a pot with a base having a multiplicity of openings, at least one nonwoven layer positioned on the base of the pot, and a cover. The at least one nonwoven layer is positioned between the base and the cover. A motor vehicle having the device is also provided.

16 Claims, 3 Drawing Sheets

(56) References Cited

U.S. PATENT DOCUMENTS

| | | | | |
|---|---|---|---|---|
| 4,268,390 A | * | 5/1981 | Cunningham | 210/232 |
| 4,301,010 A | | 11/1981 | Eddleman et al. | |
| 4,419,232 A | * | 12/1983 | Arntyr et al. | 210/164 |
| 4,783,958 A | * | 11/1988 | Borja | 60/274 |
| 5,297,299 A | * | 3/1994 | Wilson | 4/290 |
| 5,427,417 A | * | 6/1995 | Lechuga | 285/46 |
| 5,507,691 A | * | 4/1996 | Nishizawa | 454/279 |
| 5,958,226 A | * | 9/1999 | Fleischmann | 210/165 |
| 6,106,707 A | * | 8/2000 | Morris et al. | 210/163 |
| 6,176,239 B1 | * | 1/2001 | Grove et al. | 128/206.24 |
| 6,666,974 B2 | * | 12/2003 | Page | 210/747.3 |
| 6,770,252 B2 | * | 8/2004 | Cheng | 423/239.1 |
| 6,860,267 B2 | * | 3/2005 | Capon et al. | 128/206.15 |
| 6,872,029 B2 | * | 3/2005 | Allard et al. | 405/36 |
| 7,112,274 B1 | * | 9/2006 | Sanguinetti | 210/163 |
| 7,346,938 B2 | * | 3/2008 | Mattson et al. | 4/507 |
| 7,451,594 B2 | * | 11/2008 | Blaisdell | 60/324 |
| 7,685,778 B2 | * | 3/2010 | Edell | 52/16 |
| 8,082,729 B2 | | 12/2011 | Rolle et al. | |
| 8,221,632 B2 | * | 7/2012 | McInnis et al. | 210/747.3 |
| 8,277,646 B2 | * | 10/2012 | Singleton | 210/163 |
| D677,376 S | * | 3/2013 | Wolff | D23/393 |
| 2002/0068149 A1 | * | 6/2002 | Koyama et al. | 428/137 |
| 2004/0077304 A1 | * | 4/2004 | Pfannenberg | 454/184 |
| 2005/0109017 A1 | | 5/2005 | Wirkus et al. | |
| 2007/0104622 A1 | | 5/2007 | Zuberi et al. | |
| 2007/0151231 A1 | | 7/2007 | Rinaldi | |
| 2007/0157531 A1 | * | 7/2007 | Whitaker | 52/101 |
| 2008/0236118 A1 | * | 10/2008 | Meyer et al. | 55/482 |
| 2009/0101553 A1 | * | 4/2009 | Lucas | 210/164 |
| 2011/0098463 A1 | * | 4/2011 | Yoshitani et al. | 536/32 |
| 2011/0126713 A1 | * | 6/2011 | Legare et al. | 96/135 |
| 2011/0173956 A1 | | 7/2011 | Kotthoff et al. | |
| 2011/0308211 A1 | * | 12/2011 | Bader et al. | 55/497 |
| 2012/0042648 A1 | | 2/2012 | Rolle et al. | |
| 2012/0167889 A1 | * | 7/2012 | Friday et al. | 128/205.27 |

\* cited by examiner

DEVICE FOR PARTICLE SEPARATION IN AN EXHAUST-GAS RECIRCULATION SYSTEM AND MOTOR VEHICLE HAVING THE DEVICE

CROSS-REFERENCE TO RELATED APPLICATION

This is a continuation, under 35 U.S.C. §120, of copending International Application No. PCT/EP2011/060399, filed Jun. 22, 2011, which designated the United States; this application also claims the priorities, under 35 U.S.C. §119, of German Patent Application Nos. DE 10 2010 025 284.0, filed Jun. 28, 2010 and DE 10 2010 050 393.2, filed Nov. 3, 2010; the prior applications are herewith incorporated by reference in their entirety.

BACKGROUND OF THE INVENTION

Field of the Invention

The present invention relates to a device for separating, depositing, intercepting or capturing particles which are conducted through an exhaust-gas recirculation line. An exhaust-gas recirculation line serves to supply exhaust gas generated in a combustion chamber of an internal combustion engine back to the internal combustion engine as required. Such systems for exhaust-gas recirculation have already been described on numerous occasions, in particular in conjunction with a turbocharger. It is likewise known for catalyst carrier bodies and/or filters which, in particular, also have a ceramic form, to be provided in the exhaust system, directly downstream of the internal combustion engine, in order to utilize the high temperatures present there for the catalytic conversion of constituent parts of the exhaust gas. The invention also relates to a motor vehicle having the device.

A configuration having a protected turbocharger in the exhaust-gas recirculation line is disclosed in International Publication No. WO 2007/110170 A1, corresponding to U.S. Pat. No. 8,082,729 and U.S. Patent Application Publication No. US 2012/0042648. It is proposed in those documents that a screen layer be provided in a region of the exhaust-gas recirculation line, in which the screen layer is larger than an average cross section of the exhaust-gas recirculation line. As a result of the enlarged screen area, the exhaust gas can flow through the screen layer with a considerably lower pressure loss, so that an effective protective measure is realized which nevertheless only insignificantly impairs the behavior of the exhaust-gas flow approaching the turbocharger.

In the integration of such a screen or filter into the exhaust-gas recirculation line, it must be taken into consideration that a high pressure loading can occur there under some circumstances which may, for example, result in deformation of the screen or of the filter. The throughflow conditions for the exhaust gas can be changed in an undesired manner as a result.

Furthermore, it must be taken into consideration that such filters or screens can be integrated particularly easily and also as retrofit equipment, if appropriate, into existing exhaust lines for an exhaust-gas recirculation system (EGR system).

SUMMARY OF THE INVENTION

It is accordingly an object of the invention to provide a device for particle separation in an exhaust-gas recirculation system and a motor vehicle having the device, which overcome the hereinafore-mentioned disadvantages and at least partially solve the highlighted problems of the heretofore-known devices and vehicles of this general type. In particular, it is sought to specify a device which is simple to produce, which permanently withstands loadings (in particular in the exhaust-gas recirculation system) and which permits an efficient separation of particles and conversion of pollutants of the exhaust gas.

With the foregoing and other objects in view there is provided, in accordance with the invention, a device for separating particles from or out of an exhaust gas of an internal combustion engine. The device comprises a pot having a base with a multiplicity of openings formed therein, a cover and at least one nonwoven layer disposed at the base and positioned between the base and the cover.

The pot is formed, in particular, in the manner of a tubular cylindrical portion which has a base that spans the cross section (preferably with a diameter of at least 50 mm or even at least 90 mm, and very particularly preferably no greater than 200 mm). It is preferable for the pot to be formed in one piece with the base. In this case, the cylindrical portion extends preferably over a length of at least 50 mm. At the end side opposite the base, the pot may additionally be formed with a collar through which the pot can be placed, for example, into an exhaust-gas recirculation line in an abutting position, and/or connected there to the exhaust-gas recirculation line. The collar also serves, in particular, for being integrated into a connecting point of the exhaust-gas recirculation line to another line/device which conducts exhaust gas.

The base has a multiplicity of openings. The openings are preferably formed in the manner of circular and/or (oval or also curved, if appropriate) elongate openings, which preferably have a minimum diameter of at least 5 mm, preferably even of at least 10 mm. It is basically possible for the openings to be disposed in the form of concentric circles with respect to one another. It is likewise possible for at least some of the openings to be formed in the manner of polygons, of slots or the like. It is preferable for the major proportion of the area of the base to be formed with openings, in such a way that, for example, more than 50%, in particular more than 60%, of the area of the base is formed with openings. In this case, adequately stable webs should still remain between the openings, in such a way that the openings should proportionally take up no more than 85%, in particular even no more than 70%, of the area of the base.

It is also preferable for the pot to have (at least in the region of the base) a material thickness of less than 1 mm, for example even less than 0.8 mm or in particular less than 0.6 mm.

The at least one nonwoven layer preferably has a material thickness of less than 2 mm, in particular less than 1 mm. The nonwoven layer is preferably formed so as to bear areally against the base. The nonwoven layer is formed, in particular, in the manner of a filter or screen, wherein if appropriate a plurality of nonwoven layers are joined together. The nonwoven layer preferably forms an aligned configuration of wire filaments, in such a way that a pore size or back pressure for the exhaust gas is substantially constant across the cross section of the nonwoven layer. The nonwoven layer is accordingly preferably constructed (exclusively) from wire filaments which are welded, sintered, brazed and/or soldered together.

Furthermore, a cover is provided which likewise spans the nonwoven layer. The cover has a material thickness which corresponds substantially to the material thickness of the base, that is to say in particular has a material thickness of less than 1 mm, for example even less than 0.8 mm or, in particular, less than 0.6 mm. Furthermore, the cover likewise has a multiplicity of holes, which need not imperatively correspond to the pattern of the openings in the base. It is also preferable in this regard for the area of the cover to be formed predominantly by holes, in particular as has been stated above with reference to the base.

In a very particularly preferred embodiment of the device, the openings of the base and the holes of the cover are disposed so as to be aligned with one another, that is to say, in particular, in terms of form and position (congruent positioning). It is thus the case, in particular, that the openings/holes and webs of the base and cover are disposed in series (in the flow shadow) in the flow direction of the exhaust gas.

In this case, the nonwoven layer is disposed between the base and the cover in such a way that the base and the cover form areal support elements at the outside in each case. If appropriate, the at least one nonwoven layer may be (only) clamped between the base and the cover. It is, however, also possible for the at least one nonwoven layer to also be connected to at least the base (or the cylindrical portion) or the cover (in particular in a cohesive manner). The nonwoven layer is thus securely positioned on the device even under high thermal and dynamic loading.

In that configuration, the exhaust gas to be purified or cleaned flows preferably firstly through the cover of the pot, then the at least one nonwoven layer, and finally the base, although a reversed throughflow is nevertheless also possible.

In accordance with another feature of the device of the invention, the cover is wrapped around the pot at the outside. In other words, this also means that the cover has, for example, a form (in particular an encircling) of a wraparound portion which interacts at the outside with the cylindrical portion of the pot. At that location, there is formed, in particular, a force-locking or even material locking connection, for example through the use of welding, brazing or soldering. A force-locking connection is one which connects two elements together by force external to the elements, as opposed to a form-locking connection which is provided by the shapes of the elements themselves. The wraparound portion may extend, for example, over at least 5 mm of the cylindrical portion. It is preferable in this case for a radius to be provided in the base/cylindrical portion transition region and/or in the cover/wraparound portion transition region. If appropriate, the cylindrical portion of the pot may have a tapered form (with a reduced cross section or with a receptacle) in the region wrapped around by the cover, in such a way that there is no projecting length of the cover radially to the outside in relation to the cylindrical portion.

In accordance with a further feature of the device of the invention, at least the base or the cover has a curved form. In this case, the curvature is preferably aligned so as to extend in the flow direction. It should basically also be noted that the curvature of the base need not imperatively correspond to the curvature of the cover. The curved form of the base and/or of the cover allows the pot or the cover to be formed with a smaller material thickness, wherein at the same time, undesired bending as a result of the exhaust-gas back pressure, such as may arise over the course of the use of the device, takes place. It is preferable for the curvature to extend in the flow direction over a distance of at least 2 mm, in particular at least 4 mm and very particularly preferably at most 10 mm.

With such a curved construction, it is possible for bending, stresses and strains to be considerably reduced. Due to the changed load bearing behavior, only very small amounts of bending now occur in this case. The stresses in the pot (for example with a material thickness of 1.5 mm of the material 1.4509) and cover (for example with a material thickness of 0.8 mm of the material 1.4509) components remain below the yield point (approximately 140 N/mm$^2$ at 600° C.). In the case of the pot, the variant with a curvature of 5 mm toward the inside has the lowest values. As a result of the high pressure loading, additional bending of the nonwoven layer (for example with a material thickness of 0.3 mm of the material 1.4767) through the holes/openings in the cover/base takes place, wherein the stresses occurring are significantly lower than the determined yield point of the nonwoven layer itself.

In accordance with an added feature of the device of the invention, the at least one nonwoven layer is catalytically coated. In this case, a coating is used, in particular, which has an oxidation action. The oxidation coating may be formed, in particular, for the oxidation of hydrocarbon compounds and/or nitrogen compounds/nitrogen oxide compounds. It is preferable in this case for the entire nonwoven layer to be formed with the same catalytic coating.

In accordance with an additional feature of the device of the invention, it is also preferable for the nonwoven layer to be formed with a fabric. In this case a 4-ply Tela fabric, in particular, is used. Tela fabrics are distinguished by a 5-shed Atlas binding. This particular binding type yields fabrics with an open mesh, that is to say high throughflow rates, and simultaneously high mechanical stability. Suitable multilayer fabrics may, if appropriate, also be cohesively connected to one another, for example by welding. It may also be provided in this case that the orientation of the fabric and/or of the wire filaments relative to one another differ.

It is also very particularly preferable for no large-area cohesive connection to be formed between the at least one nonwoven layer, the base and the cover.

In accordance with yet another feature of the invention, the device preferably, in particular, has such a form that the base has at least one central first zone and a second zone which surrounds the first zone, and the first zone and the second zone have differently configured openings. It is very particularly preferable in this case for the first zone to extend from the center of the base over at least 20%, at least 30% or even at least 50% of a diameter of the base. In this case, the first zone is preferably formed so as to be the same shape as the base itself, that is to say for example in the form of a circle if the base is circular. In this case, however, the first zone should preferably be constructed to be not significantly larger than 50% of the diameter, that is to say, in particular, it should not exceed 60% of the diameter. The second zone then generally encompasses the rest of the region of the base between the first zone and the edge of the base. The shape of the second zone thus also matches the shape of the first zone and/or of the edge of the base, that is to say it is formed in the manner of a circular ring in the above example. It is preferable if, in the first zone, there are provided (predominantly or even exclusively) openings in the form, in particular, of curved slots which are disposed concentrically with respect to the boundary of the first zone around a central (circular) opening. In this case, the size and/or number of the slots may vary from the inside outward. By contrast, it is preferable if, in the region of the second zone, only hole recesses of identical or uniform shape are provided, which extend from the boundary of the first zone to the edge of the base. The hole recesses are furthermore curved, in particular in the manner of an involute or evolvent, and preferably widen toward the edge, in such a way that the adjacent webs between them have approximately a uniform thickness. It is furthermore preferable for the length of the hole recesses to be at least twice the length, if appropriate even several times the length, of the (in particular largest) slots in the first zone. It is basically possible for a plurality of hole recesses to be provided one behind the other in a row in order to span the distance between the boundary of the first zone and the edge, but it is preferable for this to be achieved in each case through the use of one single hole recess. It is furthermore preferable for the area proportionally taken up by the openings to be as equal as possible in the first zone and in the second zone, in such a way that a deviation of at most 15% should be adhered to, unless a predefined flow manipulation (increased back pressure) is to be attained in one of the zones. The configuration of the openings as proposed herein leads, in particular, to very good characteristics of the base under fluctuating thermal loading, in particular with regard to stresses in the base.

With the objects of the invention in view, there is concomitantly provided a motor vehicle, comprising an exhaust-gas recirculation system equipped with a device according to the invention.

The device according to the invention is used, in particular, in an exhaust-gas recirculation system of a motor vehicle, wherein the device is disposed, for example, in an exhaust-gas recirculation line. It is furthermore preferable for the exhaust gas that is conducted through the device to have already been supplied to an exhaust-gas treatment unit, for example a catalytic converter (SCR catalytic converter, oxidation catalytic converter, etc.) and/or a filter. It is furthermore preferable for the upstream exhaust-gas treatment unit to be composed of a ceramic material. In this respect, the device also serves to capture any constituent parts of the upstream exhaust-gas treatment unit which become detached, and thus prevent those constituent parts from entering the internal combustion engine and/or a turbocharger.

In this usage situation, the following ambient conditions, in particular, should be allowed for: maximum temperatures of up to approximately 800° C.; dynamic loading; and up to 600 mbar pressure loss in the exhaust-gas recirculation system at approximately 600° C.

Other features which are considered as characteristic for the invention are set forth in the appended claims, noting that the features listed individually in the claims may be combined with one another in any desired technologically expedient manner and highlight further embodiments of the invention.

Although the invention is illustrated and described herein as embodied in a device for particle separation in an exhaust-gas recirculation system and a motor vehicle having the device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
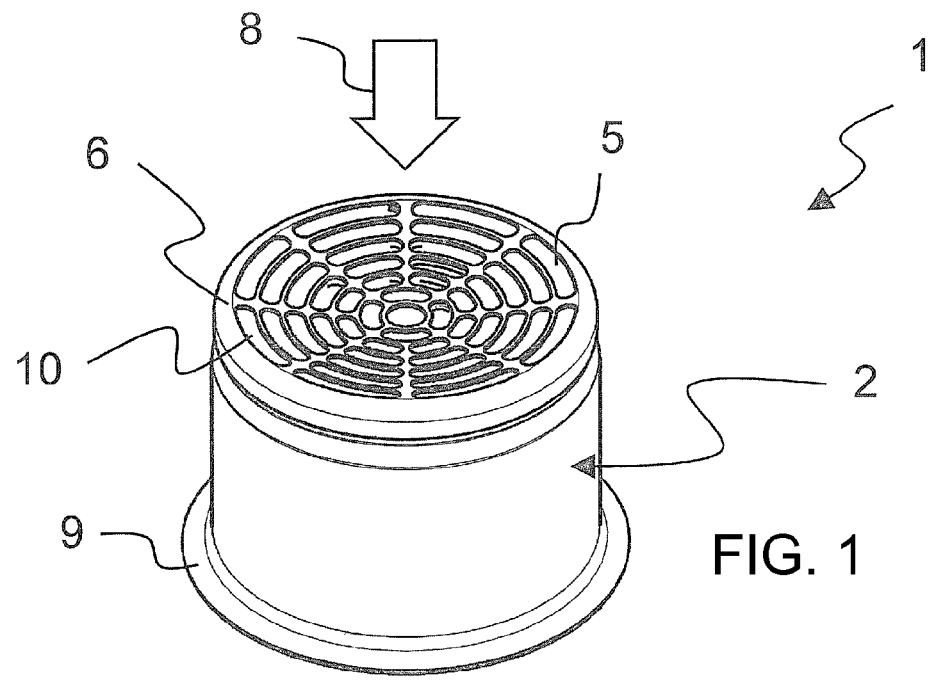
FIG. 1 is a diagrammatic, perspective view of a structural variant of a device according to the invention.

Referring now to the figures of the drawings in detail and first, particularly, to FIG. 1 thereof, there is seen a first exemplary embodiment of a device 1 for separating, depositing, intercepting or capturing particles which are conducted through an exhaust-gas recirculation line. In this case, the exhaust gas firstly flows in an indicated flow direction 8 to a cover 6 with a multiplicity of holes 10 and then passes through the holes 10. The exhaust gas and the particles contained therein thus pass to a nonwoven layer 5. As a result of the contact with the nonwoven layer 5, the particles are stopped, and gaseous/liquid components of the exhaust gas are, if appropriate, also converted.

The cover 6 is disposed on an end face of a pot 2, in particular in the manner of a cap which spans the pot 2. For this purpose, the pot 2 has a receptacle in a region of contact with the cover. If appropriate, a non-illustrated base may likewise be eliminated, as a separate component disposed inside the receptacle. An encircling collar 9 constructed in the manner of a flange, is formed at the opposite end.

Figure 2:
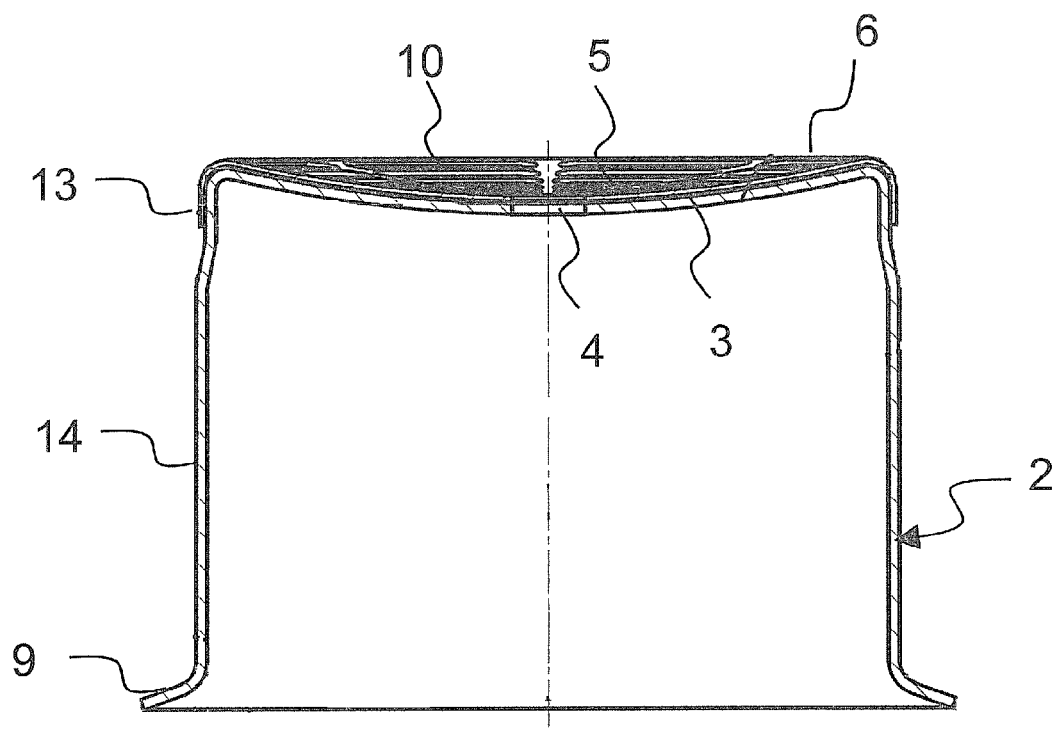
FIG. 2 is a longitudinal-sectional view of a structural variant of the device according to the invention.

FIG. 2 is a longitudinal-sectional view showing a structural variant of a device 1 having a pot 2. The pot 2 again has an encircling collar 9 close to a first face (illustrated at the bottom), which is adjoined by a cylindrical portion 14. The cylindrical portion 14 is adjoined (in an integral manner) by a base 3 with a multiplicity of openings 4. The interior of the cylindrical portion 14 is preferably free from fixtures and serves for the abutment/alignment of the pot 2 in an exhaust line. A termination is then formed by a cover 6 which has a multiplicity of holes 10. The cover 6 is formed with a (likewise encircling) wraparound portion 13 which is welded to the cylindrical portion 14 at the outside. In order to ensure that the wraparound portion 13 does not protrude radially to the outside, a tapering of the cylindrical portion 14 is provided in the contact region. The at least one nonwoven layer 5 is now positioned and securely held between the base 3 and the cover 6.

It is, however, basically pointed out that the cylindrical portion 14 may also be formed with a (radially inwardly) formed support edge, in such a way that a separate base and the at least one nonwoven layer are then fastened/clamped jointly to the cylindrical portion through the use of the cover. Other possibilities for the connection of the constituent parts of the device may likewise be given consideration.

Figure 3:
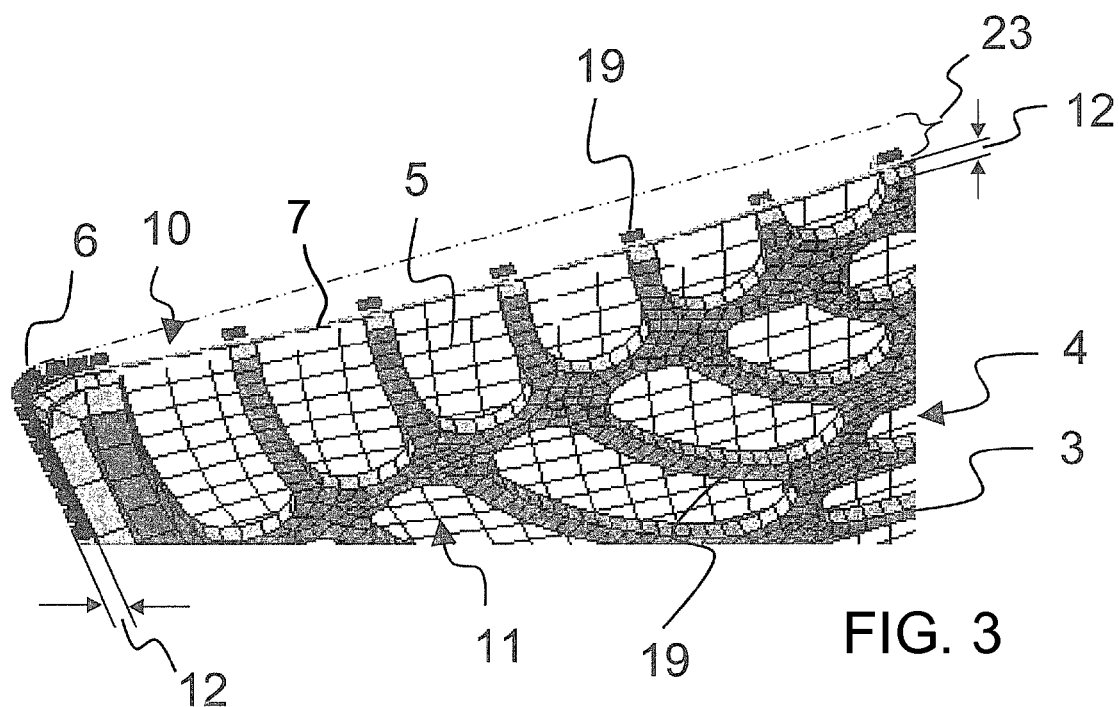
FIG. 3 is an enlarged, fragmentary, perspective view of a structural variant of the device according to the invention.

FIG. 3 is a fragmentary, sectional view of a portion of the device with the cover 6, the nonwoven layer 5 and the base 3. In this case, the view is taken in the direction of the base 3 from the interior of the cylindrical portion 14. The nonwoven layer 5 shown in this case is provided with a catalytically active coating 11. The nonwoven layer 5 is formed with four layers of a fabric 7 composed of metallic wire filaments (of different thickness). In this case, the nonwoven layer lies substantially on the base 3 of the pot 2 and spans substantially (only) the base 3. It can also be seen from this view that the holes 10 in the cover 6 and the openings 4 in the base 3 are disposed congruently with respect to one another, in such a way that remaining webs 19 (for example with a web width of at most 1.5 mm) are disposed in the flow shadow in each case.

In this embodiment, both the base 3 and the cover 6 have a material thickness 12 of less than 1 mm. In order to ensure that a highly stable configuration is likewise realized, both the base and the cover (and thus also the nonwoven layer 5 disposed in between) have a curvature. The curvature is preferably formed centrally with respect to the flow direction, in particular with a distance 23 of two (2) to five (5) mm.

Figure 4:
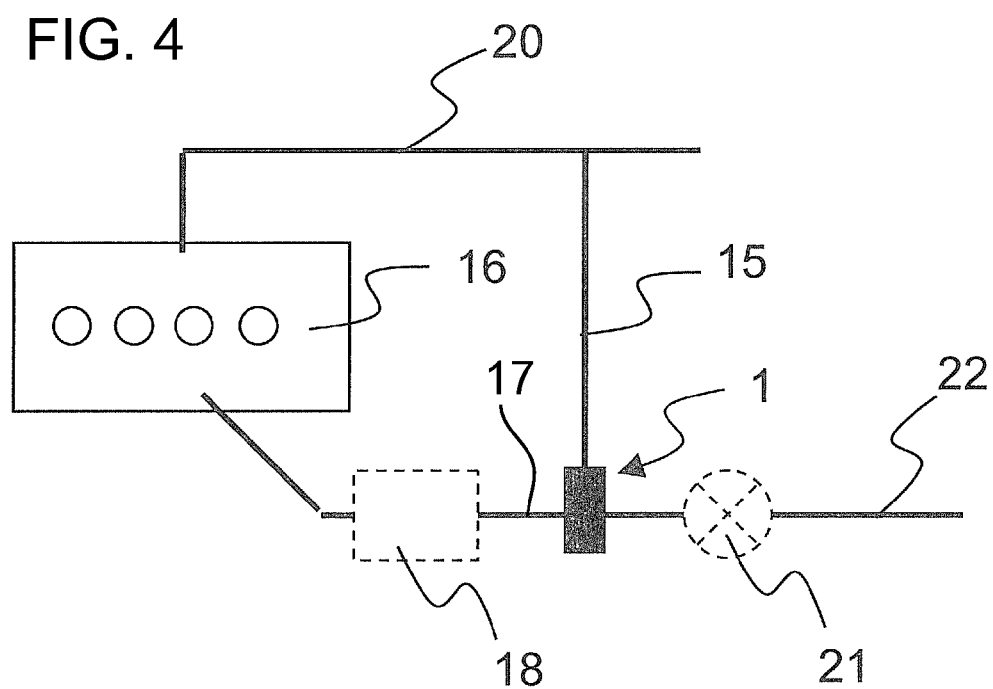
FIG. 4 is a block diagram showing the integration of a device according to the invention into an exhaust system of a mobile internal combustion engine.

FIG. 4 shows an internal combustion engine 16 having an exhaust system 17. The exhaust system 17 has an exhaust-gas treatment unit 18, downstream of the internal combustion engine 16, from which an exhaust-gas recirculation line 15 branches off downstream thereof. The device 1 is integrated in the region of the branch. All of the exhaust gas which is recirculated through an intake line 20 to the internal combustion engine 16 thus flows through the device 1. It is basically possible in this case for the exhaust-gas recirculation line 15 or the device 1 to be positioned upstream or downstream of a turbocharger 21 in an exhaust line 22.

Figure 5:
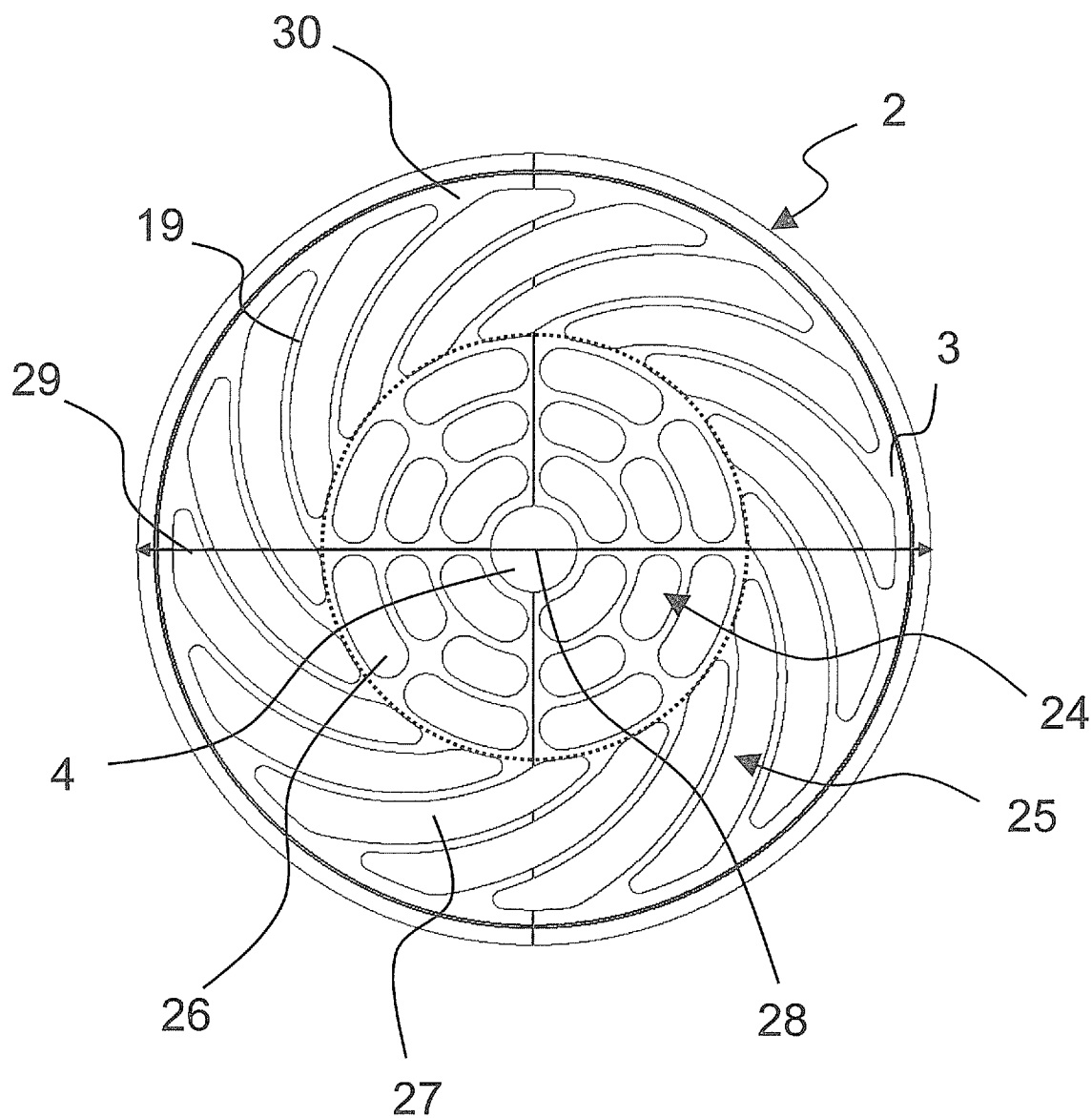
FIG. 5 is a bottom-plan view of a further structural variant of the device according to the invention.

FIG. 5 shows a plan view of a base 3 of the pot 2 of a further structural variant of the device according to the invention. In this case, the base 3 has a central first zone 24 and a second zone 25 which surrounds the first zone 24. The first zone 24 extends from the center 28 of the base 3 over approximately 50% of a diameter 29 of the base. In this case, the first zone 24 is of the same shape as the circular base 3, specifically in the form of a circle. The second zone 25 encompasses the rest of the region of the base 3 between the first zone 24 and an edge 30 of the base 3. The shape of the second zone 25 thus also matches the shape of the first zone 24 and of the edge 30 of the base 3. The first zone 24 and the second zone 25 have differently configured openings. In the first zone 24, there are provided openings in the form of curved slots 26 which are disposed concentrically with respect to the boundary of the first zone 24 around a central (circular) opening 4. By contrast, in the region of the second zone 25, hole recesses 27 of substantially identical or uniform shape are provided, which extend in each case from the boundary of the first zone 24 to the edge 30 of the base 3. The hole recesses 27 are furthermore curved, in particular in the manner of an involute or evolvent, and widen toward the edge 30, in such a way that the webs 19 have a substantially uniform thickness. The configuration of the openings as proposed herein leads in particular to very good characteristics of the base 3 under fluctuating thermal loading, in particular with regard to stresses in the base.

The invention claimed is:

1. An exhaust system, comprising:
    an exhaust gas recirculation line configured to recirculate an exhaust gas of an internal combustion engine;
    a device disposed in said recirculation line and configured to separate particles from the exhaust gas;
    said device including a pot having a base with a multiplicity of openings formed therein, a cover, and at least one nonwoven layer disposed at said base and positioned between said base and said cover.

2. The exhaust system according to claim 1, wherein said cover is wrapped around an outside of said pot.

3. The exhaust system according to claim 1, wherein at least one of said base or said cover has a curved shape.

4. The exhaust system according to claim 1, wherein said at least one nonwoven layer is catalytically coated.

5. The exhaust system according to claim 1, wherein said at least one nonwoven layer is in the form of a fabric.

6. The exhaust system according to claim 1, wherein said base has at least one central first zone and a second zone surrounding said at least one central first zone, and said first and second zones have differently configured openings.

7. A motor vehicle, comprising:
    an exhaust-gas recirculation system equipped with a device for separating particles from an exhaust gas of an internal combustion engine;
    said device including a pot having a base with a multiplicity of openings formed therein, a cover, and at least one nonwoven layer disposed at said base and positioned between said base and said cover.

8. The motor vehicle according to claim 7, wherein said cover is wrapped around an outside of said pot.

9. The motor vehicle according to claim 7, wherein at least one of said base or said cover has a curved shape.

10. The motor vehicle according to claim 7, wherein said at least one nonwoven layer is catalytically coated.

11. The motor vehicle according to claim 7, wherein said at least one nonwoven layer is in the form of a fabric.

12. The motor vehicle according to claim 7, wherein said base has at least one central first zone and a second zone surrounding said at least one central first zone, and said first and second zones have differently configured openings.

13. The exhaust system according to claim 1, wherein the exhaust system is configured to withstand temperatures up to approximately 800° C.

14. A method for operating an exhaust system, the method comprising the following steps:
    providing an exhaust gas recirculation line;
    providing a device in the recirculation line, the device including a pot having a base with a multiplicity of openings formed therein, a cover, and at least one nonwoven layer disposed at the base and positioned between the base and the cover;
    recirculating an exhaust gas of an internal combustion engine through the exhaust gas recirculation line; and
    separating particles from the exhaust gas in the device.

15. The method according to claim 14, which further comprises catalytically coating the at least one nonwoven layer.

16. The method according to claim 15, wherein the at least one nonwoven layer is in the form of a fabric.

* * * * *